3,496,712
AGRICULTURAL IMPLEMENT
Josef Pürrer and Berthold Binder, Gottmadingen, Germany, assignors to Maschinenfabrik Fahr AG., Gottmadingen, Constance, Germany, a corporation of Germany
Filed May 14, 1968, Ser. No. 729,045
Claims priority, application Germany, May 22, 1967, M 74,059
Int. Cl. A01d 79/02
U.S. Cl. 56—370                    6 Claims

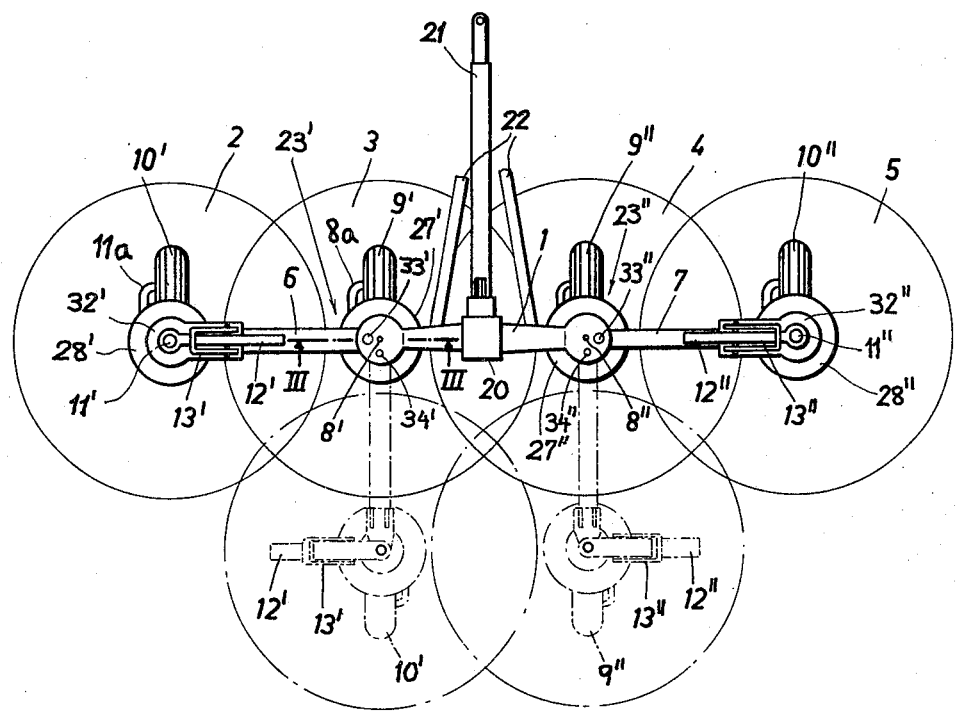
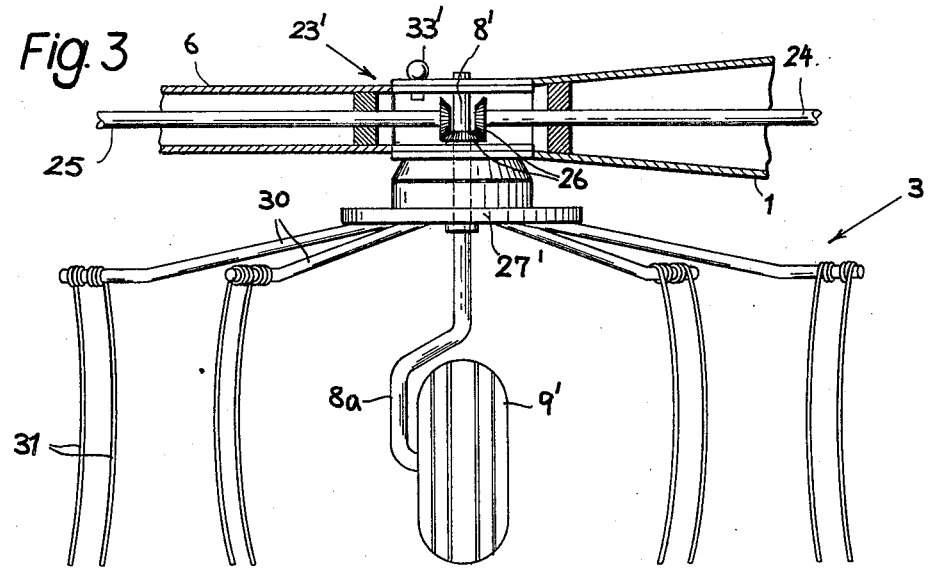

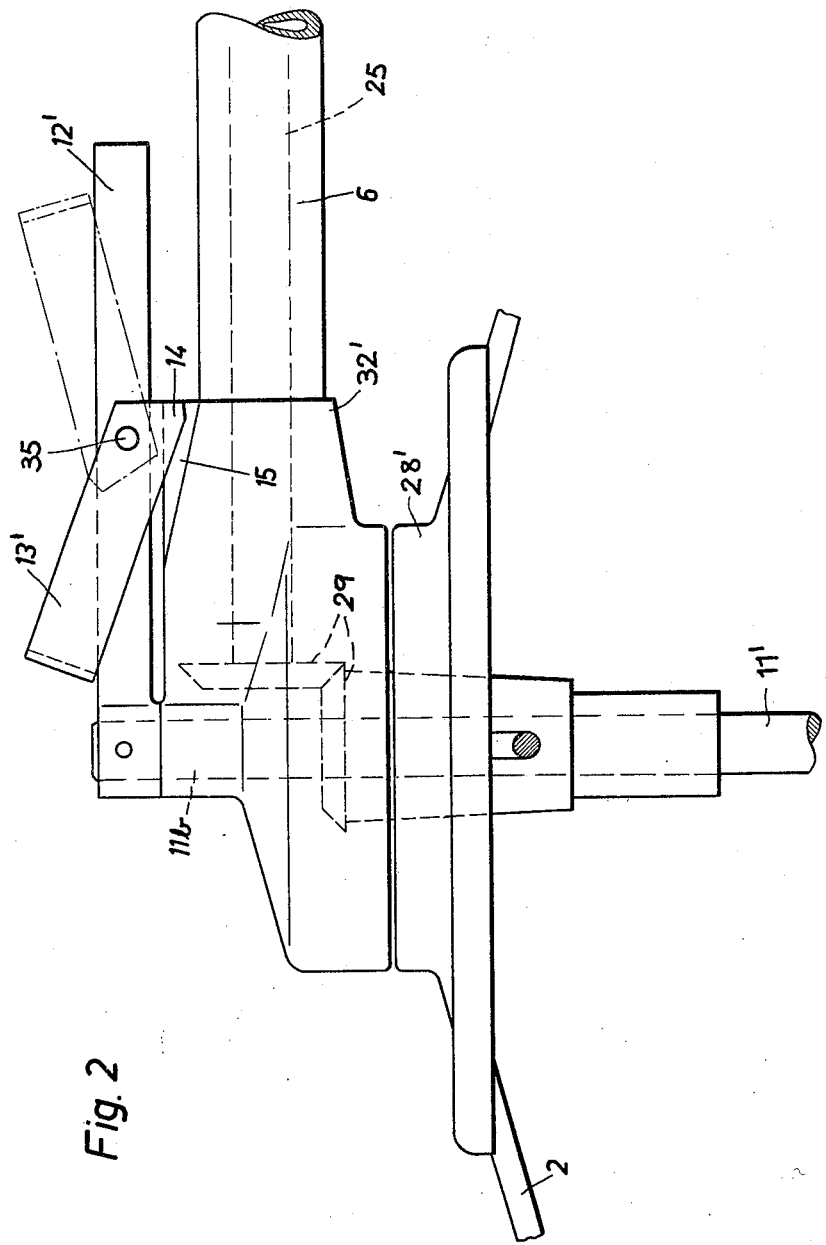

ABSTRACT OF THE DISCLOSURE

An implement to be towed by a tractor has two inner rotary rakes riding on fixedly oriented wheels at the ends of a central beam section and two outer rakes riding on swivelable wheels on the free ends of articulated extensions of the central beam section. Respective locking pawls immobilize the axles of the outer wheels to make these wheels rotate about a common axis with the inner wheels, forwardly of the beam, in a working position in which the extensions are aligned with the central section; in a traveling position, in which the extensions are swung back, the pawls are released so that the outer wheels can swing into the planes of the respective inner wheels as the outer rakes trail behind the inner rakes.

---

Our present invention relates to an agricultural implement for the raking, turning and tedding of ground crops such as cut grass, straw, stalks and the like, the implement including a plurality of rake members suspended from a substantially horizontal beam which extends generally at right angles to the direction of travel when the implement is towed by a prime mover, such as a tractor, across a field to be worked. These rake members are advantageously designed as rotary cages formed from angularly spaced prongs which depend from a set of arms extending radially outwardly from a common hub. As the hub rotates about a more or less vertical axis, by means of a drive mechanism mounted within or on the supporting beam and coupled with the power take-off shaft of the tractor, the lower tips of the prongs orbit in substantially circular planes around an axle having a supporting wheel journaled on its lower end. A tractor attachment of this type is described in commonly assigned application Ser. No. 577,335 filed Sept. 6, 1966 by Michael Stampfer.

It is generally desirable to provide a minimum of four rotary rakes in order to create a wide swath, thereby increasing the efficiency of the equipment. As the implement in this case is considerably wider than its tractor, means must be provided for reorienting the rake-supporting structure with respect to the direction of travel to facilitate transportation of the machine to and from the field. A solution heretofore proposed for this purpose (see commonly assigned application Ser. No. 647,065 filed by one of us, Joseph Pürrer, on June 19, 1967) involves the swinging of two outer beam sections, each carrying at least one rake member, with reference to a central beam section articulated thereto, the outer sections being movable between an aligned or working position and a retracted or traveling position in which these sections are substantially parallel and their rake members trail behind the rake members of the central section. According to another commonly owned application, Sr. No. 647,069 filed June 19, 1967 by Joseph Pürrer and Martin Maier, the axles of the wheels carried on the relatively swingable sections are interconnected by parallelogrammatic linkages insuring the maintenance of parallelism between the respective wheels.

The general object of our present invention is to provide an improved mounting for the wheels of such an assembly in which the supporting wheels on the retractable beam extensions are positively held in a substantially coaxial relationship with the central wheels in the working position of the implement and are free to align themselves in a substantially coplanar relationship with these inner wheels in the traveling position.

Another object of our invention is to provide means for insuring that, in the working position of such an implement, each wheel lies close to the forward point of the sweep of the associated rake so that the effective part of the sweep occurs at the proper distance from ground even in the case of highly irregular terrain.

According to an important feature of our present invention, the axles of the inner wheels are fixedly secured to respective ends of the central section whereas the axles of the outer wheels are swivelably journaled in the free ends of the articulated beam extensions. The latter axles can be selectively arrested, by suitable locking means, in positions in which the outer and inner wheels are substantially coaxial when the beam extensions are aligned with the central setcion; upon the retraction of these extensions, a release of the locking means lets the axles of the outer wheels rotate through substantially 90°, with reference to their supporting beam sections, so that the outer wheels now lie substantially in the planes of the inner wheels as their associated rake members trail behind the rake members of the central section.

Advantageously, in order to let the rakes follow the terrain as closely as possible, we provide all the wheel axles with bent lower ends to which the respective wheels are journaled, these lower ends being forwardly curved in the substantially coaxial wheel position. During road travel, when the outer axles are released, the lower ends thereof swing toward the rear so as to increase the effective length of the wheel base. We have found that this reduces the tendency of the attachment to sway on the highway and to swing toward the downhill side when moving along a slope.

The invention will be described in greater detail hereinafter with reference to the accompanying drawing in which:

FIG. 1 is a top view of an attachment embodying the invention;

FIG. 2 is a rear view, drawn to a larger scale, of the mounting of an outer wheel axle on a beam extension of the attachment of FIG. 1; and FIG. 3 is an enlarged fragmentary view taken, partly in section, on the line III—III of FIG. 1.

The implement shown in the drawing comprises a supporting structure in the form of a central beam section 1 and a pair of outer extensions or arms 6, 7 which are articulated to the central section at 23' and 23", respectively. Central beam section 1 forms a housing 20 for a drive gear, not shown, in mesh with a pinion on a shaft 21 which can be coupled to the power take-off shaft of an associated tractor, likewise not illustrated. A conventional towing linkage secured to section 1 has been partly shown at 22.

The joint 23' between the tubular beam sections 1 and 6 has been more fully illustrated in FIG. 3 which, of course, is also representative of the opposite, symmetrical joint 23". Beam sections 1 and 6 have bifurcated ends articulately interconnected by a rod 8' which is rigid with beam section 1 and forms an axle with a forwardly curved lower end 8a to which a wheel 9' is journaled; the axis of wheel 9' is parallel to section 1 and, in the aligned position of FIG. 1, also to sections 6 and 7. A central shaft 24, journaled in beam section 1, and an extension shaft 25, rotatably disposed in beam section 6, are interconnected for joint rotation by a set of meshing bevel gears 26 which transmit the torque of drive shaft 21 to a rotatable hub 27' and a similar hub 28' (FIGS. 1 and 2) journaled on the free end of extension 6; hub 28', driven from shaft 25 via beveled gears 29, is traversed by an axle 11' having a forwardly curved lower end 11a on which another wheel 10' is journaled. Similar wheels 9" and 10" are journaled on the correspondingly curved lower ends of axles 8" and 11", the former passing through the junction 23", the latter being swivelably mounted in the free end of arm 7.

A set of four rotary rakes 2, 3, 4 and 5, indicated diagrammatically in FIG. 1 by the orbits of their respective prong cages, are mounted in that order on hubs 28', 27', 27" and 28" which are rotatably disposed on the upper ends of axles 10', 9', 9" and 10", respectively. Each of these rotary rakes, as particularly illustrated for rake 3 in FIG. 3, comprises a set of four angularly equispaced radial arms 30 with depending prongs 31. It will be noted that, in the working position illustrated in full lines in FIG. 1, the wheels 9', 9", 10' and 10" are coaxially arranged in the forward halves of the orbits of the associated rakes, thus in proximity to the most effective portion of the sweep of the prongs 31. With the orbits 2-5 overlapping, as shown, adjoining rakes mesh in interleaved relationship of their prongs.

As further illustrated in FIG. 2, wheel axle 11' has a top portion 11b which projects upwardly beyond the enlarged extremity or head 32' of beam extension 6 and has fixed to it a lever 12' lying parallel to that beam section in the illustrated working position. A pawl 13' is pivoted at 35 to lever 12' and has side wings 14 which straddle a rib 15 on head 32' whenever the pawl 13' is in the position illustrated in full lines in FIGS. 1 and 2. A similar lever 12" with pawl 13" is disposed on a head 32" forming the free end of beam section 7 as shown in FIG. 1. When the pawl is swung into its alternate position illustrated in dot-dash lines in FIG. 2, axle 11' is free to swing relatively to arm 6, together with wheel 10' which can thus swivel through 90° from a position at right angles to that arm into a position aligned therewith as illustrated in dot-dash lines in FIG. 1. When arms 6 and 7 are simultaneously swung into their retracted and mutually parallel position, also shown in dot-dash lines in FIG. 1, the wheels 10' 10" are free to assume a position coplanar with wheels 9' and 9", respectively, while trailing behind the support structure 1, 22.

In order to maintain the beam sections 1, 6 and 7 in mutual alignment when the implement is to be used for work on the field, suitable detent means such as a pair of drop pins 33' and 33" may be used; the ends of beam section 1 may be provided with additional holes 34', 34" through which the pins may be dropped in order to lock the extensions 6 and 7 in their alternate, retracted positions.

It will be apparent that the locking mechanism shown in FIG. 2 may be modified, as by letting the lugs 14 engage in recesses of head 32' rather than straddling a rib 15 thereon, and that the beam 1, 6 and 7 or its individual sections may be limitedly rotatable about the beam axis to enable an inclination of the rake axes with reference to the vertical. Also, the beam sections may be interconnected with limited freedom of relative tilting in a vertical plane, e.g. as disclosed in the aforementioned copending application Ser. No. 647,065, and the coupling between shafts 24, 25 may be of a type disconnecting these shafts from each other in the retracted position, as likewise disclosed in the last-mentioned application. These and other modifications, readily apparent to persons skilled in the art, are intended to be embraced within the spirit and scope of our invention except as otherwise limited in the appended claims.

What is claimed is:

1. An agricultural implement adapted to be towed by a tractor, comprising a beam with a central section and a pair of lateral extensions of said central section articulated to the latter for movement between an aligned position and a retracted position in which said extensions are swung back through substantially 90° into mutual parallelism; a pair of inner supporting wheels having first axles fixedly secured to respective ends of said central section for coaxially holding said wheels in respective planes of rotation perpendicular to said central section, a pair of outer supporting wheels having second axles swivelably journaled in the free ends of said extensions for swinging between two relative positions substantially 90° apart whereby said outer wheels can be disposed substantially coaxially with said inner wheels in said aligned position and substantially coplanar with said inner wheels in said retracted position, said second axles having upper ends projecting from said extensions; detent means for releasably maintaining said extensions in said aligned position; locking means including elements rigid with said upper ends for selectively arresting said second axles in the position relative to said extensions in which said inner and outer wheels are substantially coaxial; and a set of rake members on said central section and on said extensions.

2. An implement as defined in claim 1 wherein said first and second axles have bent lower ends forming journals for the respective wheels, said lower ends being forwardly curved in the substantially coaxial position of said wheels.

3. An implement as defined in claim 2 wherein said rake members are two inner and two outer rotary cages with depending prongs orbiting about said first and second axles, respectively, said wheels in their substantially coaxial position being located in the forward halves of the respective orbits of said cages.

4. An implement as defined in claim 3 wherein said cages have hubs rotatably supported on the respective axles.

5. An implement as defined in claim 1 wherein said elements are levers extending substantially parallel to the axes of said outer wheels.

6. An implement as defined in claim 5 wherein said locking means further includes a pair of pawls pivotally mounted on said levers and respectively engageable with said extensions.

References Cited

FOREIGN PATENTS

| 1,218,779 | 6/1966 | Germany. |
| 1,271,098 | 7/1961 | France. |
| 80,922 | 5/1963 | France. |
| 1,158,304 | 11/1963 | Germany. |
| 1,352,607 | 1/1964 | France. |
| 963,108 | 7/1964 | Great Britain. |

RUSSELL R. KINSEY, Primary Examiner